(12) United States Patent
McAllen et al.

(10) Patent No.: US 10,942,588 B2
(45) Date of Patent: Mar. 9, 2021

(54) LATENCY ADJUSTMENT OF USER INPUT DEVICES

(71) Applicant: Microsoft Technology Licensing, LLC, Redmond, WA (US)

(72) Inventors: Christopher Michael McAllen, Sammamish, WA (US); Matthew Bronder, Bellevue, WA (US); James Andrew Goossen, Sammamish, WA (US); Christopher John Tector, Sammamish, WA (US); Hamze Kalache, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/290,867

(22) Filed: Mar. 2, 2019

(65) Prior Publication Data

US 2020/0278758 A1      Sep. 3, 2020

(51) Int. Cl.
  *G06F 3/038*   (2013.01)
  *G06F 3/023*   (2006.01)
  *G06F 3/0354*  (2013.01)
  *G06F 3/041*   (2006.01)
  *A63F 13/23*   (2014.01)
  *A63F 13/44*   (2014.01)

(52) U.S. Cl.
  CPC .............. *G06F 3/038* (2013.01); *A63F 13/23* (2014.09); *A63F 13/44* (2014.09); *A63F 2300/1025* (2013.01); *A63F 2300/638* (2013.01); *G06F 3/023* (2013.01); *G06F 3/03543* (2013.01); *G06F 3/0416* (2013.01)

(58) Field of Classification Search
  None
  See application file for complete search history.

(56) References Cited

U.S. PATENT DOCUMENTS

| 2007/0087836 | A1 | 4/2007 | Pasula |
| 2016/0180811 | A1 | 6/2016 | Colenbrander |
| 2017/0010946 | A1 | 1/2017 | Orakwue et al. |

OTHER PUBLICATIONS

"International Search Report and Written Opinion Issued in PCT Application No. PCT/US2020/019400", dated Jun. 8, 2020, 08 Pages.

*Primary Examiner* — Nicholas J Lee

(57) ABSTRACT

Enhanced user input devices and user input interfacing systems are provided herein which can reduce perceived interaction latency. In one example, a method of operating a user input interface on a host system includes identifying a target pace for delivery of user input state to an application, and determining, based at least on the target pace, one or more timing parameters for transfer of the user input state from a user input device. The method also includes indicating the one or more timing parameters to the user input device, wherein the user input device responsively transfers the user input state according to the one or more timing parameters.

20 Claims, 5 Drawing Sheets

LATENCY ADJUSTMENT OF USER INPUT DEVICES

BACKGROUND

User input devices can be employed to interface with various interactive systems, such as gaming consoles, computing environments, computer systems, virtual/augmented reality devices, and other devices and systems, which can also include aviation, military, or industrial control systems. The Microsoft Xbox® family of gaming consoles are example systems which can employ user input devices, commonly referred to as gaming controllers. Gaming controllers are configured to communicate with gaming consoles over wired or wireless interfaces. In such gaming systems, gaming controllers can employ joysticks, thumbsticks, control sticks, proportional triggers, gamepads, adaptive control mechanisms, or other input mechanisms. Various computing systems can also employ touch screens, keyboards, mice, trackpads, adaptive controllers, virtual/augmented reality controllers, or other similar equipment.

These user input devices allow for user manipulation of on-screen user interface elements, which might be graphical in nature. A common complaint among users of gaming systems that employ user interface devices is perceived input latency between user manipulation of an input device and changes to on-screen user interface elements. For instance, when a user pushes a button on a gaming controller, the user expects to see user interface elements of a corresponding game react to that button push. However, due to input and rendering latency, sometimes what is displayed seems less responsive than what the user would expect.

Overview

Enhanced user input devices and user input interfacing systems are provided herein which can reduce perceived interaction latency. In one example, a method of operating a user input interface on a host system includes identifying a target pace for delivery of user input state to an application, and determining, based at least on the target pace, one or more timing parameters for transfer of the user input state from a user input device. The method also includes indicating the one or more timing parameters to the user input device, wherein the user input device responsively transfers the user input state according to the one or more timing parameters.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

User input devices can be employed in computing environments to interface with gaming consoles, computing platforms, computer systems, virtual/augmented reality devices, and other devices and systems. For example, the Microsoft Xbox® family of gaming systems can communicate with one or more gaming controllers to control on-screen user interface elements. When a game or user application is employed on the gaming systems, user interaction with gaming controllers can affect graphical and textual user interface elements rendered onto an associated display. These user input devices typically include both mechanical and electrical elements to allow for user manipulation of on-screen user interface elements. Systems that employ user interface devices can experience input latency, as perceived by users, between user manipulation of an input device and changes in on-screen user interface elements. For instance, when a user pushes a button on a gaming controller, the user might experience a slight delay in corresponding changes to rendered user interface elements. This can be especially problematic in games and applications with precise or rapid on-screen movements and interactions, such as first-person shooter (FPS) style of games or precision computer-aided drawing applications. Although increased sampling rates of input device mechanisms can be achieved, this does not ensure that perceived input latency is reduced or that stale user input state is occasionally delivered to applications.

Input devices normally send information about the current input device state to a host system on their own cadence. When an application goes to consume this input device state, it is often stale on the order of up to tens of milliseconds due to lag or latency from a combination of factors including input device sampling delays, transfer delays over one or more communication links, and processing or handling delays within software elements of a host system, among other factors. This lag or latency in receipt of the input device state by the application on the host system results in perceptible input latency to users. Discussed herein are enhanced systems, architectures, and methods for applications to request synchronization for input device state delivery to application-defined epochs. Advantageously, this ensures that the application has more recent input device state than normally achieved.

Figure 1:
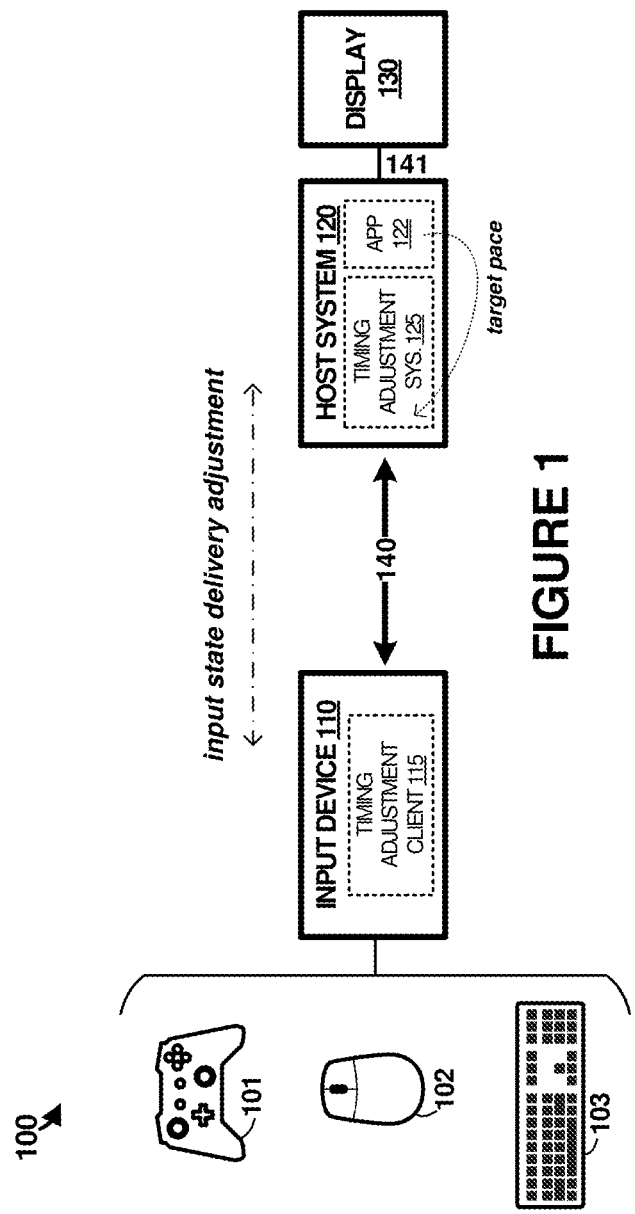
FIG. 1 is a system diagram of a user input environment in an implementation.

As a first example of enhanced user input devices and user interfacing elements of host systems, FIG. 1 is presented. FIG. 1 is a system diagram illustrating user input environment 100. Environment 100 includes input device 110, host system 120, and display device 130. Input device 110 and host system 120 communicate over link 140. Host system 120 and display device 130 communicate over link 141. Input device 110 is an example of any suitable user input device, such as those types shown in FIG. 1 for elements 101-103. Links 140-141 can comprise wireless or wired links, and are discussed in further detail below. Although gaming controllers and gaming systems might be employed in environment 100, it should be understood that the discussion can also apply to other user input devices and types of user systems.

Input device 110 includes timing adjustment client 115, and host system 120 includes application 122 and timing adjustment system 125. In operation, a user will employ input device 110 to interact with application 122 executed by host system 120. Timing adjustment client 115 and timing adjustment system 125 operate to reduce user input latency for application 112 in transfer of information indicating the user manipulation of input device 110. This information indicating the user manipulations is referred to herein as input device state, and typically comprises digital representations of the user manipulations which are transferred by input device 110 for delivery to host system 120. In some examples, timing adjustment system 125 adjusts delivery of input device state from input device 110 in accordance with input state timing requests issued by application 122 or other elements of host system 120.

Figure 2:
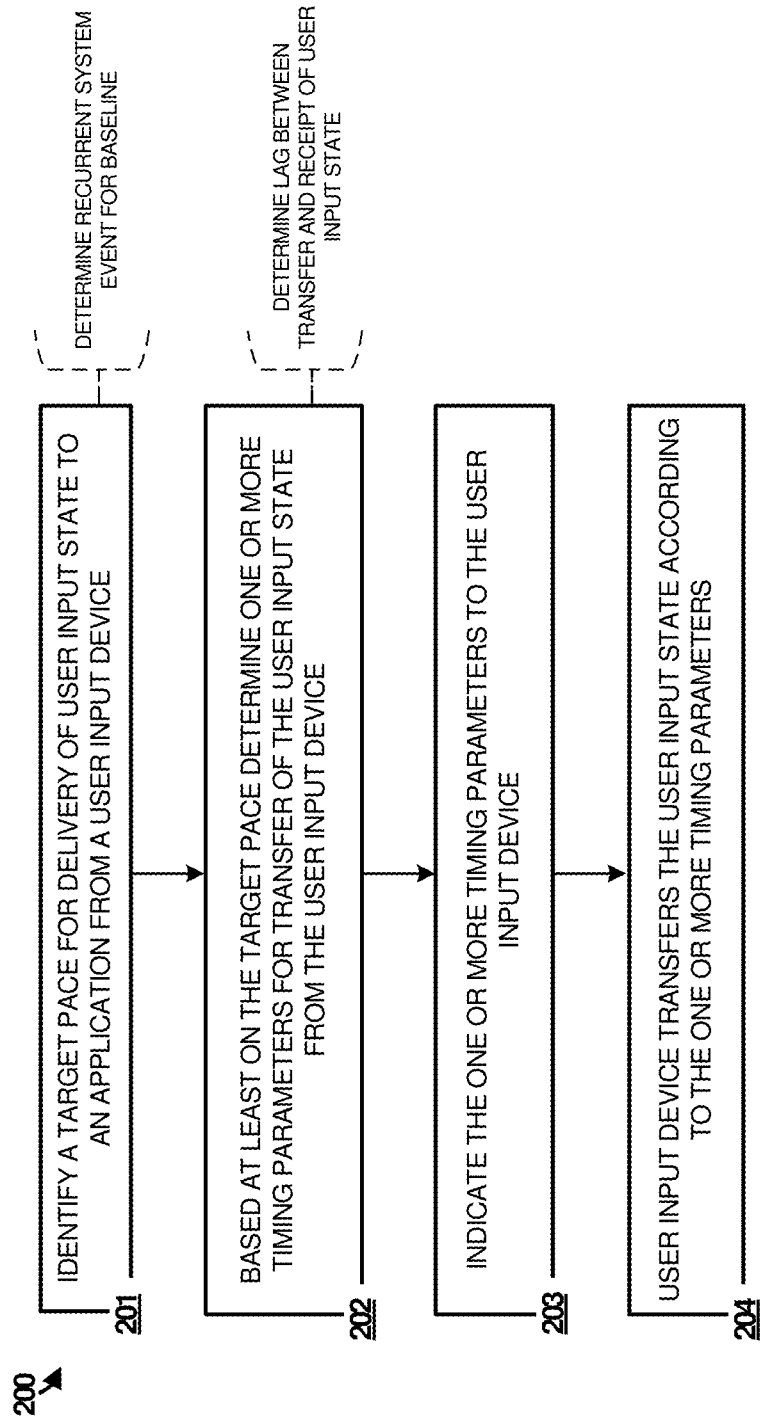
FIG. 2 illustrates a method of operating a user input interface in an implementation.

FIG. 2 is a flow diagram illustrating an example method of operation of elements included in environment 100. The operations of FIG. 2 are referenced parenthetically below. In FIG. 2, an input state delivery adjustment process is detailed, where input state delivery timing is adjusted between input device 110 and host system 120. Host system 120 identifies (201) a target pace or target cadence for delivery of user input state to application 122 from user input device 110. A target pace or target cadence refers to a repeating or cyclical time interval which separates individual transfers of user input state. Timing adjustment system 125 can receive an indication of the target pace from application 122. The indication of the target pace might comprise an indication of a recurrent event within host system 120 that executes application 122 and a timing offset from the recurrent event. The recurrent system event can be employed as a baseline event from which timing adjustments are made using at least a timing offset.

Recurrent system events related to graphics rendering or display refresh can be referenced by application 122 in the target pace. This can be due in part to these recurrent system events being correlated to user interface elements affected by user input state of input device 110. Example recurrent system events include display refresh indicators, a display vertical sync indicators (VSYNC), or graphics frame rate timing characteristics of a graphics process of host system 120. For example, VSYNC signals might be employed to indicate timing for display refresh operations or display rendering operations with regard to display 130. This VSYNC signal, referring to a vertical sync refresh of display 130, recurs cyclically according to a refresh interval, such as 60 Hertz (Hz), 120 Hz, or other refresh intervals. Another recurrent system event might include a frame rate for rendering graphics associated with application 122 by a graphics processing portion of host system 120. This frame rate might correspond to a frames-per-second (FPS) metric.

The timing offset can be used to offset delivery of user input state to application 122 from a recurrent system event, such as those discussed above. For example, the timing offset might be a time indication in microseconds (µs) to delay delivery of the user input state with regard to the recurrent system event. Thus, a desired delivery time for user input state to application 122 can correspond to a number of microseconds after each occurrence of the system event. The timing offset can allow application 122 processing time to integrate each new instance of user input state into rendering operations, user interface alteration/update operations, gaming logic operations, and other user interface triggering based on changes in user input state.

Although timing adjustment system 125 can receive an indication of the target pace from application 122, in further examples, this timing indication can be determined by timing adjustment system 125 without direct involvement of application 122. This can be referred to as predictive, adaptive, or automatic user input state timing adjustment. In these adaptive timing adjustment examples, timing adjustment system 125 monitors timing associated with one or more system calls or requests from the application for user input state. Timing adjustment system 125 can then determine a target pace based at least on timing associated with one or more requests. For example, timing adjustment system 125 might determine that the request for user input state from application 122 exhibits a particular pace or rate which is periodic or quasi-periodic. Timing adjustment system 125 then determines a timing offset from this adaptively determined pace or rate from which the timing adjustments discussed below are made. In this manner, an application need not be specially configured to receive benefits of the enhancements in user input state delivery discussed herein.

Once a target pace has been identified, host system 120 determines (202), based on that target pace, one or more timing parameters for transfer of the user input state from input device 110. The one or more timing parameters might comprise transfer interval and a transfer offset for adjustment in transfers of successive user input state from input device 110. The transfer interval indicates a periodic or cyclical time for user input device 110 to transfer user input state over link 140. The transfer interval might comprise a cyclical time corresponding to the recurrent system event determined in operation 201, or might comprise a different periodic interval. The transfer offset can be based at least in part on a lag between transmission of the user input state by input device 110 and receipt of the user input state by a user input interface of host system 120.

To determine the transfer offset, timing adjustment system 125 determines a lag or delay between transfer of user input state by input device 110 and subsequent receipt of that user input state by host system 120. Various ways can be employed by timing adjustment system 125 to determine this lag. For example, an estimate of the lag might be made based on estimated link delay and other delays in transfer of user input state by input device 110. However, a more direct measurement can instead be made by timing adjustment system 125. This direct measurement can comprise instructing input device 110 to produce a timing indicator that corresponds to when input device 110 transfers the user input state, and this timing indicator can be included in signaling, packets, or frames which accompany or include the user input state. In other example, a separate calibration process is performed between timing adjustment client 115 in input device 110 and timing adjustment system 125 in host system 120. This calibration process can include transfer of the timing indicator in traffic from input device 110 destined for host system 120. The timing indicator can also be included with each instance of user input state delivered to host system 120, or a portion thereof. In further examples, timing adjustment system 125 periodically requests inclusion of the timing indicator to accompany user input state to make adjustments due to operational drift.

The timing indicator can comprise a timestamp or a monotonically changing count generated by timing adjustment client 115 of input device 110, and included in communications transferred by input device 110. A monotonically changing count can comprise an increasing count or decreasing count which is incremented or decremented according to a clock signal, time granularity, or periodic event of input device 110. A predetermined number of count digits or predetermined count size can be used, and when a count limit or maximum count is reached, then the count can be reset or roll-over to an initial value to begin count incrementing or decrementing anew. The count size is typically sized so as to allow for one or more instances of user input state transfer or to allow for a time delay greater than a maximum expected lag which ensures proper calculation of the actual lag.

Once received by timing adjustment system 125, the timing indicator can be used by timing adjustment system 125 to determine a transfer offset. The transfer offset is determined to compensate for a lag or delay between when input device 110 transfers user input state and when interface elements of host system 120 receive this user input state. Thus, timing adjustment system 125 determines, based on the target pace and the lag, the one or more timing parameters that are indicated to input device 110.

As noted above, a first of the timing parameters can include a transfer interval. This transfer interval corresponds to the recurrent system event employed as a timing baseline in operation 201. Since input device 110 might not have visibility to the particular recurrent system event of host system 120, timing adjustment system 125 can indicate the transfer interval in another metric or notation to input device 110. For example, the recurrent system event of host system 120 might comprise a VSYNC signal or other recurrent signal noted herein. Timing adjustment system 125 can determine an equivalent transfer interval that corresponds to the VSYNC signal or other recurrent system event, and transfer an indication of this timing interface to input device 110. The indication of the transfer interval might be translated into an interval having a time granularity which can be interpreted by input device 110, such as an absolute granularity in microseconds or a relative granularity tied to a clock or recurrent event to which user device 110 has visibility.

A second of the timing parameters can include a transfer offset. This transfer offset indicates an offset in time relative to the transfer interval which compensates for the lag or delay when transferring user input state from input device 110. However, this transfer offset also takes into account the timing offset for application 122 which is related to the recurrent system event. The lag and the timing offset are considered when calculating the transfer offset to ensure that delivery of the user input state to application 122 coincides with the desired delivery time—as noted by the recurrent system event and timing offset. In one example, the lag and timing offset are converted into a common time granularity and then added together to produce the transfer offset. In other example, the transfer interval is considered in this calculation to ensure that any offset in timing between the transfer interval and the recurrent system event are taken into account. Other delays, lags, offsets, intervals, and timing parameters can be taken into account as well.

Once the one or more timing parameters are determined by timing adjustment system 125, these timing parameters are indicated (203) to input device 110 over link 140. Timing adjustment client 115 receives these timing indicators and makes adjustments to the operation of input device 110 according to the timing indicators. Specifically, timing adjustment client 115 makes adjustments to input device 110 so that input device 110 transfers (204) the user input state according to the one or more timing parameters. These adjustments might include adjusting when user input is sampled from input mechanisms, when user input state updates or changes are determined by input device 110, and when communication interface elements of input device 110 transfer user input state for delivery over link 140.

During operation, the relative timing among input device 110 and host system 120 might drift and re-introduce latency or other noticeable effects even with the timing adjustments. Periodic timing calibrations to the adjustments can be performed using the process described above. These periodic timing calibrations can correct or compensate for drift in the various timing parameters, timing offsets, or other signals. Moreover, changes in the lag between input device 110 and host system 120 might change over time due to changes in link characteristics (e.g. wireless signal delay) when wireless links are employed for link 140. These periodic timing calibrations can be made responsive to periodic timers, responsive to power-on of input device 110 or host system 120, upon startup of application 122, responsive to user requests or user commands, or when drift above a certain threshold level is experienced, among other considerations.

In addition to initial or periodic calibration or adjustment processes, application 122 might request different timing intervals or offsets based on in-application activity. For example, during non-interactive portions of an application, such as a game cut-scene or animation, user input might not be employed. However, once the non-interactive portion of the application completes, user input might again be desired. Application 122 can anticipate such transitions between non-interactive and interactive regimes and issue one or more requests for user input state timing adjustments. These timing adjustments might be made to ensure that stale user input data is not presented to application 122 at the transition between regimes. Moreover, a timing offset indicated by application 122 can be used to re-align user input state delivery with regard to a recurrent system event to provide enhanced transition from the non-interactive regime and entry into an interactive regime.

Returning to a detailed discussion on the elements of FIG. 1, input device 110 is shown as an exemplary input device comprising a game controller 101, mouse 102, or keyboard 103. However, input device 110 can comprise any type of user input device. In gaming systems, such as Xbox® systems, user input devices can include gaming controllers, which employ joysticks, thumbsticks, control sticks, proportional triggers, gamepads, adaptive control mechanisms, or other input mechanisms. Various computing systems can also employ touch screens, keyboards, mice, trackpads, adaptive controllers, virtual reality controllers, augmented reality controllers, or other similar equipment. However, the various types and forms of user input devices typically share common elements to receive user manipulation and user input. These are referred to as input mechanisms, and can include control sticks, directional pads (d-pads), buttons, keys, triggers, pedals, wheels, or other input elements. Further input mechanisms can be employed, such as touchpads, touchscreens, voice controls, or other input mechanisms, including combinations thereof. Input mechanisms typically have corresponding electromechanical elements and structural elements to receive user manipulation, and also include measurement elements to interpret the user manipulation into electrical signaling. Measurement elements, such as position sensing elements and transducer elements, can be included in input device 110, and can comprise potentiometers, position determination circuitry, angular resolvers, optoelectronic position sensors, magnetic sensors such as Hall effect sensors or magnetoresistive sensors, encoders, capacitive sensors, inductive sensors, or other position measurement elements and position sensing elements. Analog-to-digital (A/D) conversion elements can also be included in control circuitry of input device 110 to translate electrical signaling from analog measurement or positioning signals into digital representations of input data. These digital representations can be transferred over link 140 to host system 120 for control of user interface elements associated with application 122 or other software. However, as discussed herein, timing adjustment client 115 is also included in input device 110 to perform adjustments to sampling and delivery of user input state.

Host system 120 comprises an end user system, such as gaming systems, augmented/virtual reality systems, terminals, computer systems, computing devices, tablet devices, smartphones, personal computers, servers, cloud-based systems, distributed computing platforms, and the like. Users, such as users of a gaming system, entertainment platform, or computing system can interact with user interface elements of host system 120 via user interface devices. Host system 120 can include processing systems, memory systems, storage systems, network interface equipment, user interface elements, audio and graphics processing systems, video handling systems, as well as user input state timing adjustment services, such as timing adjustment system 125. Host system 120 can comprise one or more microcontrollers, microprocessors, application-specific integrated circuits (ASICs), field-programmable gate arrays (FPGA), or discrete logic and associated circuitry, including combinations thereof. Host system 120 can include further hardware and software elements, such as video processors, graphics cores, video cards, graphics interface cards, video memory, graphics engines, execution units, rendering units, memory interface units, or other elements, including combinations and variations thereof.

Display device 130 can comprise one or more video monitors, televisions, projectors, touchscreens, transported video interfaces, virtualized interfaces, or other video or graphics viewing elements, including combinations thereof. Display device 130 can have one or more input interfaces for receiving graphics or video from a source, such as from host system 120 over link 141. Display device 130 can include various display technologies. For example, display device 130 can comprise light emitting panels or light projection displays, among others. Display panels typically comprise displays such as liquid crystal (LCD), light-emitting diode (LED), or organic light-emitting diode (OLED). Light projection displays typically comprise Digital Light Projection (DLP) displays, or Micro-Electro-Mechanical Systems (MEMS) displays, or laser-scanned displays, among others.

Link 140 comprises a user input device link, which might comprise one or more wired or wireless communication links. Link 140 can comprise various logical, physical, or application programming interfaces (APIs). Example links can use metal, glass, optical, air, space, or some other material as the transport media. Link 140 can use various protocols and formats, such as universal serial bus (USB), Bluetooth (such as IEEE 802.15.1), WiFi (IEEE 802.11), infrared communications, Internet Protocol (IP), Ethernet, transmission control protocol (TCP), near-field communication (NFC), other wired or wireless data interfaces, proprietary communication signaling, or some other communication format, including combinations, improvements, or variations thereof. Link 140 can include direct links or may include intermediate networks, systems, hubs, routers, or devices, and can include a logical network link transported over multiple physical links.

Link 141 can comprise one or more communication links, such as one or more video links comprising wireless or wired links. Link 141 can comprise various logical, physical, or application programming interfaces (APIs). Example links can use metal, glass, optical, air, space, or some other material as the transport media. Link 141 can use various video protocols and formats, such as High-Definition Multimedia Interface (HDMI), Video Electronics Standards Association DisplayPort, Mobile Industry Processor Interface (MIPI) Alliance Display Serial Interface (DSI), Digital Visual Interface (DVI), Wireless Display (WiDi), Miracast, Video Graphics Array (VGA) interfaces, wireless display interfaces, or other digital and analog video links including interface types that are transported over other types of links. In some examples, video data can be transported over link 141 using various data protocols, such as IP, Ethernet, hybrid fiber-coax (HFC), WiFi, Bluetooth, other wired or wireless data interfaces, or some other communication format, including combinations, improvements, or variations thereof. Link 141 can include direct links or may include intermediate networks, systems, or devices, and can include a logical network link transported over multiple physical links. Link 141 can include routers, switches, bridges, traffic handling nodes, hubs, and the like for transporting traffic among endpoints.

Figure 3:
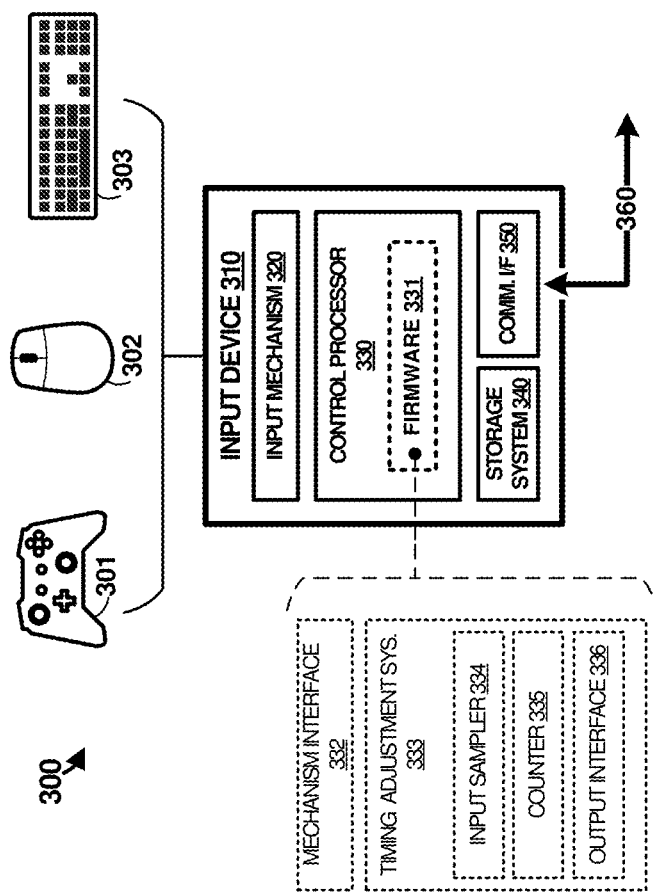
FIG. 3 is a system diagram of a user input device in an implementation.

To further illustrate enhanced systems for making timing adjustments to reduce latency in user input devices, FIG. 3 is provided. FIG. 3 is a system diagram illustrating input device 310, as an example of input device 110 in an implementation. FIG. 3 includes user input environment 300. Example operations of the elements of FIG. 3 are discussed below with regard to FIG. 5.

Turning first to the elements of FIG. 3, environment 300 includes input device 310 which communicates over link 360. Input device 310 is shown as an exemplary input device comprising a game controller 301, mouse 302, or keyboard 303. However, input device 310 can comprise any type of user input device discussed above for input device 110 of FIG. 1, although variations are possible. Input device 310 includes input mechanism 320, control processor 330, firmware 331, storage system 340, and communication interface 350. Communication interface 350 communicates over link 360, which comprises any of the link and protocol types discussed above for link 140, although variations are possible.

Figure 4:
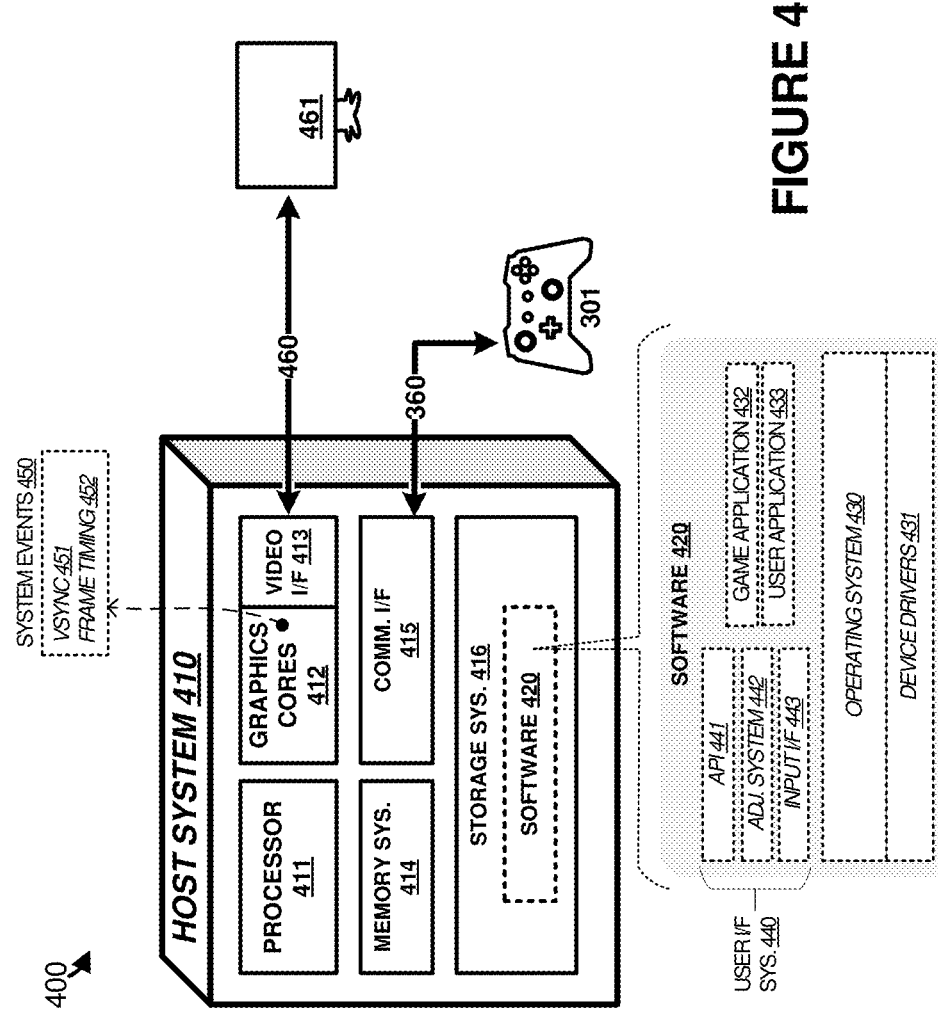
FIG. 4 is a system diagram of a host system in an implementation.

Input device 310 can be coupled over link 360 to a host system, such as host system 120 in FIG. 1 or host system 410 in FIG. 4. A user can manipulate one or more input mechanisms 320 to control user interface elements presented by a host system. These user interface elements can include graphical and textual elements presented on a display of the host system. Control processor 330 can monitor signals associated with the user manipulation one or more input mechanisms 320 to produce user input state based on the user manipulation. As will be discussed below, input device 310 includes enhanced circuitry, firmware, and processing to reduce latency for application or games executed by a host system to which input device is communicatively coupled.

Input mechanism 320 comprises various user-facing controls with corresponding electromechanical elements to receive user manipulation and user input. Input mechanism 320 can include actuators, keys, buttons, directional pads (d-pads), triggers, stick controls, pedal controls, wheel controls, pad controls, or other types of controls discussed herein. Input mechanism 320 has corresponding measurement elements to interpret the user manipulation into electrical signaling. Measurement elements, such as position sensing elements and transducer elements, can be included in input mechanism 320, and can comprise potentiometers, position determination circuitry, angular resolvers, optoelectronic position sensors, magnetic sensors such as Hall effect sensors or magnetoresistive sensors, encoders, capacitive sensors, inductive sensors, or other position measurement elements and position sensing elements. A/D conversion circuitry can also be included to translate electrical signaling from analog measurement or positioning signals into digital representations of input data for input to control processor 330. In some examples, control processor 330 includes A/D conversion circuitry and receives analog signals from input mechanism 320. Sampling of the analog signals from input mechanism 320 can occur according to predetermined sample rates, or according to a dynamic or adjustable sample rates based on timing adjustments made by control processor 330.

Control processor 330 can comprise one or more microcontrollers, microprocessors, application-specific integrated circuits (ASICs), field-programmable gate arrays (FPGA), or discrete logic and associated circuitry, including combinations thereof. Control processor 330 can include, or be paired with, one or more analog-to-digital conversion elements to receive user input associated with input mechanism 320. Control processor 330 can comprise data processing elements, data storage elements, among other elements. In some examples, control processor 330 comprises discrete logic and circuitry, while in further examples control processor 330 comprises one or more portions of various microprocessors, software, firmware, storage, and related elements. In FIG. 3, control processor 330 executes firmware 331, which can be stored in storage system 340 until transferred to memory elements of control processor 330 for execution.

Firmware 331 comprise mechanism interface 332 and timing adjustment system 333. Mechanism interface 332 comprises one or more digital interfaces configured to receive digital representations of movement data encoded by elements of input mechanism 320. Mechanism interface 332 can be coupled to a logical or physical interface to input mechanism 320, which might include one or more buffers, signal conditioners, signal debounce features, transceivers, wired or wireless interfaces, serial or parallel interfaces, among other elements.

Timing adjustment system 333 comprises a software or firmware service executed by control processor and configured to adjust delivery timing for user input state provided over link 360. Timing adjustment system 333 might comprise one or more computer-executable instructions stored on non-transitory storage media, such as storage system 340 or execution memory of control processor 330, although variations are possible. In FIG. 3, timing adjustment system 333 includes input sampler 334, counter 335, and output interface 336. Although a brief discussion of these elements of timing adjustment system 333 are discussed now, further details are found in the discussion of FIG. 5.

Input sampler 334 comprises an interface to receive digital representations of user manipulation of input mechanism 320. These digital representations can be sampled at a particular sample rate, such as by A/D circuitry or other similar circuitry, and provided to control processor 330 for delivery to input sampler 334. In some examples, input sampler 334 can adjust or control the sample rate using one or more signals provided to sampling circuitry, such as enable signals or trigger signals provided to A/D circuitry. When input sampler 334 adjusts a sample rate or sample period, input sampler 334 can base this sample rate upon a transfer interval received over link 360, with timing offsets based on a transfer offset received over link 360.

Counter 335 includes one or more processes to count cycles of time with regard to a count granularity. Counter 335 can maintain counts in one or more registers, memory locations, or other storage elements. These counts can comprise timestamps indicating a current system time, or may instead comprise monotonically increasing or decreasing counts having a count granularity. Counter 335 can provide indications of the present count for inclusion with communications transferred over link 360. Counter 335 can also track or generate a periodic timing signal which is used to trigger delivery of user input state by output interface 336. This periodic timing signal can be based on a transfer interval received over link 360.

Output interface 336 comprises adjustable interfacing processes to provide user input state over link 360 using communication interface 350. Output interface 336 can also adjust a delivery time of the user input state according to one or more timing parameters received over link 360. Although a sample rate associated with sampling circuitry might differ from the transfer interval and transfer offset provided in the one or more timing parameters, output interface 336 can compensate for these differences to ensure delivery of the user input state in accordance with the one or more timing parameters. This might entail buffering of user input state until transfer according to the one or more timing parameters, or indicating to input sampler 334 to control sampling circuitry according to the one or more timing parameters.

Communication interface 350 comprises transceivers, interfacing circuitry, control logic, and other elements for communicating digital representations of user input state and other information over link 360. Communication interface 350 can comprise circuitry, processing elements, and software that communicates over various protocols and formats, such as USB, Bluetooth, IP, Ethernet, TCP, WiFi, NFC, infrared communications, other wired or wireless data interfaces, or some other communication format, including combinations, improvements, or variations thereof.

As a further example of adjustable user input state delivery techniques and implementations, FIG. 4 is provided. FIG. 4 is a system diagram illustrating adjustable user input state delivery environment 400. Environment 400 includes host system 410 display 461, and game controller 301. Host system 410 and display 461 communicate over link 460. Host system 410 and gaming controller 301 communicate over link 360. Gaming controller 301 is an example of input device 310 of FIG. 3. Example operation of the elements of FIG. 4 are discussed below with regard to FIG. 5.

Host system 410 illustrates a control system that is representative of any system or collection of systems in which the various operational architectures, scenarios, and processes disclosed herein may be implemented. For example, host system 410 can be used to implement any of the control elements of FIG. 1, such as host system 120. Taking the example where elements of environment 400 comprise a user system, such as a gaming system or virtual/augmented reality system (which might include having a virtual/augmented reality headset), a user can couple the example user system to a selected display device, noted in FIG. 4 as exemplary display 461. This selected display device can include any associated physical monitors, televisions, projectors, or might include virtualized or networked display systems. Display devices can couple through associated links to video interface circuitry 413 host system 410, which can include associated connectors, cabling, interface electronics, and other circuitry represented by link 460.

Host system 410 includes processor 411, graphics cores 412, video interface 413, memory system 414, communication interfaces 415, and storage system 416. Elements of host system 410 can comprise system-on-a-chip (SoC) elements, peripheral elements, discrete circuitry, and various other forms of computing equipment. Host system 410 can also include an enclosure, case, or chassis, along with any associated power supply elements, cooling elements, and integrated user indicators, such as power and status indicators. Elements of host system 410 can communicate over associated communication busses or interfaces, and can receive power from associated power systems.

Host system 410 includes various software which directs operation of processing elements of host system 410 to operate as discussed herein. In one implementation, software 420 is stored on a non-transitory computer-readable medium, such as storage system 416. Processor 411 loads and executes software 420 from storage system 416. Software 420 includes user operating system 430, device drivers 431, game application 432, user application 433, and user interface system 440 which are representative of the processes, services, and platforms discussed with respect to the preceding Figures. user interface system 440 further comprises application programming interface (API) 441, adjustment system 442, and input interface 443. When executed by processor 411 to provide enhanced user input services, among other services, software 420 directs processor 411 to operate as described herein for at least the various processes, operational scenarios, and sequences discussed in the foregoing implementations. Host system 410 may optionally include additional devices, features, or functionality not discussed for purposes of brevity.

Referring still to FIG. 4, processor 411 may comprise a micro-processor and processing circuitry that retrieves and executes software 420 from storage system 416. Processor 411 may be implemented within a single processing device, but may also be distributed across multiple processing devices, processing cores, or processing sub-systems that cooperate in executing program instructions. Examples of processor 411 include general purpose central processing units, application specific processors, and logic devices, as well as any other type of processing device, combinations, or variations thereof.

Graphics cores 412 include various hardware components, such as processing stages, memory elements, and other pipelined processing elements for processing graphics data into rendered graphics that is presented on a display. Graphics cores 412 might be provided in a graphics processing unit (GPU) with one or more graphics cores and associated memory elements. Graphics cores 412 can include one or more stages or internal components that can process content/data into rendered images for display. These elements can include shaders, texture memory, texture units, tile maps, residency maps, and other various elements. Moreover, video interface 413 can be included in portions of graphics cores 412, or might comprise element external to graphics cores 412 for interfacing with the particular signaling and protocols employed by link 460 and display 461.

Graphics cores 412 can generate/render video data responsive to operation of host system 410, such as user interaction with user interface elements, media content playback, augmented/virtual reality operations, and other activities. This video data, comprised of a plurality of timewise organized video frames, can be stored in frame buffers for output to a display device. These frame buffers can be filled and emptied according to various recurrent events associated with graphics cores 412 and display 461, such as according to VSYNC timing of display 461 or frame rates of graphics generated by graphics cores 412. In FIG. 4, the recurrent events can correspond to system events 450 comprising VSYNC 451 and frame timing 452, although others can be employed.

Memory system 414 can comprise random-access memory (RAM) or other memory types which allow for execution of software 420 by processor 411. Memory system 414 and storage system 416 together can comprise a non-transitory data storage system, although variations are possible. Memory system 414 can include volatile and nonvolatile, removable and non-removable media implemented in any method or technology for storage of information, such as computer readable instructions, data structures, program modules, or other data. Memory system 414 can each comprise additional elements, such as controllers, capable of communicating with processor 411.

Communication interface 415 may include communication connections and devices that allow for communication with various operational elements, user interface devices, peripheral devices, display devices, or communication networks. Examples of connections and devices that together allow for inter-system communication may include system management interfaces, network interfaces, network interface cards, communication busses, antennas, RF circuitry, transceivers, and other communication circuitry. The connections and devices may communicate over communication media to exchange communications with other computing systems or networks of systems, such as metal, glass, air, or any other suitable communication media.

Storage system 416 may comprise any computer readable storage media readable by processor 411 and capable of storing software 420. Storage system 416 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media.

In addition to computer readable storage media, in some implementations storage system 416 may also include computer readable communication media over which at least some of software 420 may be communicated internally or externally. Storage system 416 may be implemented as a single storage device, but may also be implemented across multiple storage devices or sub-systems co-located or distributed relative to each other. Storage system 416 may comprise additional elements, such as a controller, capable of communicating with processor 411 or possibly other systems.

Software 420 may be implemented in program instructions and among other functions may, when executed by processor 411, direct processor 411 to operate as described with respect to the various operational scenarios, sequences, and processes illustrated herein. For example, software 420 may include program instructions for implementing enhanced user input services, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 420 may include additional processes, programs, or components, such as operating system software or other application software, in addition to or that including user interface system 440. Software 420 may also comprise firmware or some other form of machine-readable processing instructions executable by processor 411.

In general, software 420 may, when loaded into processor 411 and executed, transform a suitable apparatus, system, or device (of which host system 410 is representative) overall from a general-purpose computing system into a special-purpose computing system customized to provide enhanced user input services, among other services. Indeed, encoding software 420 on storage system 416 may transform the physical structure of storage system 416. The specific transformation of the physical structure may depend on various factors in different implementations of this description. Examples of such factors may include, but are not limited to, the technology used to implement the storage media of storage system 416 and whether the computer-storage media are characterized as primary or secondary storage, as well as other factors.

For example, if the computer readable storage media are implemented as semiconductor-based memory, software 420 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Operating system 430 comprises one or more operating elements used to support execution of user applications by processor 411 of host system 410. Operating system 430 can comprise various kernel units, task execution units, instruction fetching units, resource allocation units, resource sharing units, memory management units, and other various functions and units provided by typical operating systems. Example operating systems include Windows®, Linux, Unix, MacOS®, and other similar operating systems which may provide graphical user interfaces or command line user interfaces. Along with these functions, operating system 410 can comprise, or interwork with, device drivers 431.

Device drivers 431 each are configured to interface with a particular type of communication interface or peripheral device. For example, a network interface might communicate via a network interface card (NIC) which has a particular device driver configured to communicate with the hardware-level circuitry of the NIC and provide an interface to the hardware for operating system 430 and applications executed in operating system 430. Graphics cores 412 can have one or more device drivers which allow operating system 430 to interface with graphics cores 412. When gaming controller 301 or other user input devices are coupled over link 360, this link might have a particular device driver assigned thereto, such as a USB or Bluetooth device driver, among others. The device driver communicates signaling from the physical layer of a device or interface up through various software stack layers for final presentation to operating system 430 and one or more user applications.

Game application 432 and user application 433 each comprise user-provided applications which execute on processor 411 within operating system 430. Game application 432 can comprise entertainment applications such as first-person shooters (FPS), real-time strategy (RTS) games, side-scrolling games, puzzle games, card games, board games, among others. User application 433 can comprise office productivity applications, system administration applications, email applications, browser applications, media player applications, connectivity applications, utilities, drawing/painting applications, and other various applications. It should be understood that game application 432 and user application 433 are merely representative of the many different types of user applications that might be employed.

However, game application 432 and user application 433 both can receive user input in the form of user input state from one or more user input devices, such as gaming controller 301 in FIG. 4, among any of the other input devices discussed herein. These applications might desire to have reduced impact or influence of user input state latency. User interface system 440 is provided to reduce the impact or effect of user input state latency with regard to at least game application 432 and user application 433.

User interface system 440 is included in software 440 and provides for user input and output related operations of host system 410. User interface system 440 can receive input from input devices over input interface 443, and can receive input from applications over API 441. However, it should be understood that other interface systems can be provided, such as for control of input devices, host system 410, or applications, games, or platforms executed by host system 410.

Input interface 443 comprises circuitry or program instructions configured to receive input device state transferred by input devices and other peripherals. Input interface 443 can comprise data interfaces customized to particular input devices or peripherals, along with one or more buffers to store received input device state before delivery to applications, games, and other operating system portions. Input interface 443 can include portions of a network stack or protocol stack in cases where multi-layer protocols are employed to transfer data between devices and host system 410. In some examples, portions of input interface 443 can be integrated into device drivers 431 or operating system 430.

Adjustment system 442 comprises circuitry or program instructions configured to receive requests to adjust delivery of input device state to applications, such as game application 442, and to determine adjustment instructions for delivery to input devices which alter transfer timing of user input state. Adjustment system 442 can comprise link lag or latency determination units which determine a link lag between a user input device and an application. Adjustment system 442 can anticipate or adaptively enact timing or delivery adjustments according to user input request timing detected for one or more applications. In this manner, an application need not request alteration of input delivery in order for enhanced user input state delivery. Adjustment system 442 can also periodically adjust user input state delivery timing to reduce the effect of drift over time between device/host clocks, or input device interfaces.

API 441 comprises circuitry or program instructions configured to interface with applications to request synchronization tied to a variety of system events. This typically takes the form of the application indicating an event identifier (event ID), and a time offset from that event, although other configurations are possible. API 441 can also receive count information or timing indicators originally transferred by an application which indicates when an input device initially transferred user input state. In other examples, API 441 might receive an indication of a time of receipt of user input state from which adjustment system 442 can calculate link lag between a user input device and an application.

Figure 5:
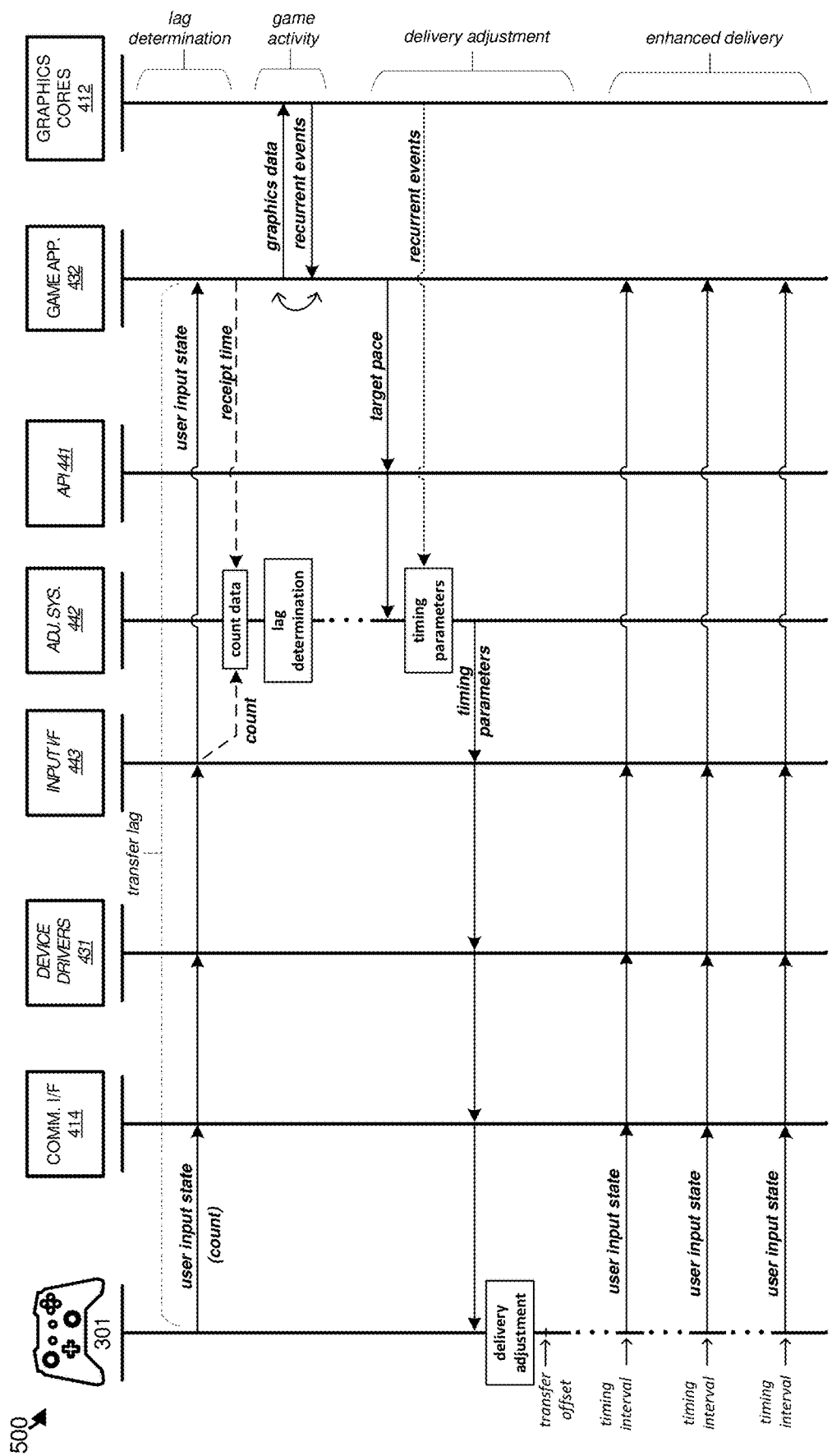
FIG. 5 illustrates a method of operating a user input interface in an implementation.

Turning now to a detailed description of an example operations of the elements of FIG. 3 and FIG. 4, timing diagram 500 is presented in FIG. 5. For the example of FIG. 5, gaming controller 301 is coupled over link 360 to host system 410. It should be understood that other user input devices and associated links can instead be employed using a similar operation as described below. In many examples, host system 410 includes many concurrent user input devices, and each of these user input devices can be individually adjusted or calibrated for user input state delivery.

FIG. 5 has several phases of activity indicated on the right-hand side of the Figure. These phases of activity can occur in a different order than that indicated in FIG. 5. A first phase of activity includes a lag determination phase in which user interface system 440 determines a lag or latency between an input device, such as gaming controller 301, and host system 410. A second phase of activity includes a game activity phase in which game application 432 and graphics cores 412 interact to process user input and render graphics for delivery to display 461. This second phase typically occurs throughout many of the other phases disused in FIG. 5, and would comprise normal in-game activity. A third phase of activity includes a delivery adjustment phase in which user interface system 440 can adjust transfer/delivery of user input state from gaming controller 301 to host system 410. A fourth phase of activity includes an enhanced delivery phase in which adjustments to the transfer/delivery of user input state are enacted by gaming controller 310. The fourth phase of activity will typically be coincident with in-game activity indicated by the second phase of activity.

In FIG. 5, an application executed in operating system 430, such as game application 432, determines when it would like to receive user input from a user input device, which can vary from application to application. For example, game application 432 might want to read game controller state two milliseconds after the start of each new graphics frame that is being rendered by graphics cores 412, so game application 432 can run associated game world simulations and prepare a next graphics frame for rendering. In another example, applications that are controlling an animation on a large LED array display may want to read user input at a rate that is tied to the animation in some way.

During execution of game application 432 in the second phase of activity, graphics data or render instructions are provided to graphics cores 412 by game application 432 for rendering into graphics frames displayable on display 461. Graphics cores 412 or other elements of host system 410 will typically have one or more recurrent system events which can correspond to the activities of graphics data rendering or display. As mentioned above, these can include cyclic frame rendering indicators, VSYNC indicators, or other similar indicators. Typically, game application 432 will have visibility to these various indicators, and can trigger various game events or graphics rendering activities based on occurrence of these indicators for the recurrent system events. Game application 432 is thus aware of rendering epochs and associated scheduling of game events and graphics events. Game application 432 can pre-render frames or buffer frames in anticipation of game events that occur responsive to user control. These pre-rendered or buffered frames may or may not be displayed depending on what action the user takes with regard to user input.

However, game application 432 and other similar applications typically desire to associate changes in user input state with particular frames on which user-initiated actions occur. For example, a user pushing a button or selecting a particular direction on a control stick might affect on-screen elements rendered for the user. The delay from when the user actuates the particular user control, such as a button, and when the on-screen elements are displayed to a user can create a perceptible lag. This can reduce the usability of the game and enjoyment for the user, among other disadvantages. Thus, game application 432 would like to at least partially synchronize user input to the graphics frames on which the user input is reflected on-screen, reducing a perception of input lag or latency to users. Rendering or pre-rendering of graphics frames is typically correlated in time to one or more recurrent system events, and game application 432 can use these one or more recurrent system events as a baseline or trigger from which user input state can be delivered to game application 432. Game application 432 can determine a delta or offset from the one or more recurrent system events, and indicate that user input state should be delivered according to that offset from the recurrent system event. This delta or offset can advantageously provide for consistent application of user input state to rendered frames by allowing game application 432 to at least synchronize user input state to particular game activity, such as elements in rendered frames. Game application 432 can thus be provided with the "freshest" user input state available by triggering not only delivery of user input state to game application 432 based on recurrent system events, but also by triggering sampling and transfer of user input state at the input device level. Upstream handling of this triggering by user input devices is coordinated by user input system 440.

To indicate such timing, a delivery adjustment phase can occur where game application 432 can indicate a recurrent system event via API 441. This recurrent system event can be used to trigger delivery of user input state to game application 432. User interface system 440 also can have visibility in host system 410 to these recurrent system events and can determine timing adjustments relative to the same events. In addition to an indication of the recurrent system event, an offset from this recurrent system event can be indicated by game application 432 which can allow game application 432 time to process user input state and apply that user input state to particular rendered frames or to initiate game-related activity. Thus, game application 432 indicates a target pace or target cadence at which game application 432 wants to receive user input state to better synchronize that user input state with on-screen elements. Game application 432 can advantageously optimize latency of user input state to coincide with rendering events, display screen electrical timing, or other recurrent system events. Once API 441 receives, from game application 432, the one or more indications of recurrent system events and offsets, then user interface system 440 can responsively initiate a timing adjustment phase. The one or more indications of recurrent system events and offsets comprise a target pace or target cadence that also indicates the offset from the recurrent system event.

In an alternative to receiving one or more indications of a recurrent system event or offset from a recurrent system event, adjustment system 442 might perform a predictive or adaptive adjustment process. In this adaptive adjustment process, adjustment system 442 examines calling patterns of game application 432, and determines whether game application 432 is requesting user input state in a predictable pattern. If such a pattern can be found, adjustment system 442 requests input synchronization on behalf of game application 432 without game application 432 having to request such input synchronization. This pattern can be used to determine a relevant recurrent system event from which to baseline delivery of user input state to game application 432, as well as any offset from that recurrent system event.

User interface system 440 determines timing and scheduling for user input transfer/delivery based on the indications received from game application 432 or based on adaptive or predictive determinations. However, part of this timing and scheduling for user input transfer/delivery can depend upon a transfer lag or transfer latency experienced between transfer of user input state from game controller 301 and receipt by game application 432. A lag determination phase can thus be initiated to determine this transfer lag or transfer latency. Moreover, the lag determination phase can periodically be initiated to account for drift and link changes over time. This periodic drift adjustment can be especially helpful when wireless links are employed.

In a lag determination phase, different lag determination processes might occur. In a first example lag determination process, game application 432 receives a timing indicator transferred by gaming controller 301 that corresponds to a time when gaming controller 301 transmits user input state. This timing indicator can comprise a monotonically changing count generated by gaming controller 301 and accompanying or included in communications comprising the user input state transferred by the user input device. Once game application 432 receives this user input state with an accompanying count, game application 432 can indicate the count and a time of receipt of the user input state to user interface system 440. In one instance, game application 432 tags or updates a data structure or data cookie that is visible to user input system 440. User input system 440 can read this data structure to determine the count or timestamp associated with when game controller 301 initially transmitted the user input state and when game application 432 receives the user input state. Adjustment system 442 determines a difference in time indicated by the count and timestamp to determine a transfer lag or latency between transmission of the user input state by game controller 301 and receipt by game application 432.

In a second example lag determination process, a timing indicator, such as a count referred to above, is transferred by game controller 301 for delivery to user interface system, 440 or adjustment system 442. Adjustment system 442 determines a time or timestamp associated with receipt of the timing indicator transferred by game controller 301. From this time or timestamp, adjustment system 442 can derive the transfer lag or latency. In this second example process, adjustment system 442 might also determine a further latency between receipt of the timing indicator by user interface system 440 and game application 432 to determine a total transfer lag between gaming controller 301 and game application 432. When the count discussed above is employed, adjustment system 442 can be configured to deal with rollover that occurs in the counter received from game controller 432.

Once a transfer lag is determined, then adjustment system 442 can conduct a delivery adjustment phase. In the delivery adjustment phase, adjustment system 442 processes the one or more indications of recurrent system events and offsets received over API 441 as well as the transfer lag to determine one or more timing parameters used for transfer of user input state. The one or more timing parameters comprise a transfer offset and a transfer interval for adjustment of transfer of successive user input state from game controller 432. The transfer offset is determined based at least in part on the offset from the recurrent system event received over API 441 and the transfer lag determined in the lag determination process.

In one example, the transfer offset comprises the offset from the recurrent system event indicated by game application 432 and the transfer lag for game controller 301. The transfer offset comprises an indication in +/−microseconds informing gaming controller 301 to speed up or delay its next input state delivery. This allows for real-time correction of clock drift on gaming controller 301, as well as for reducing the effect of transfer lag to ensure proper timing of receipt of user input state by game application 432 with regard to the recurrent system event. Adjustment system 442 can compute two values, a number of microseconds until a next input state should be sent from an input device, and an interval in microseconds at which subsequent user input state traffic should be sent from the device. These values are then sent to gaming controller 301 over link 360.

Timing adjustment system 333 of gaming controller 360 then responsively alters delivery pace/cadence and timing for user input state. The enhanced delivery phase comprises delivery of user input state from gaming controller 301 to host system 410 once gaming controller adjusts user input state traffic as described above. As can be seen in FIG. 5, a transfer offset is used by gaming controller 301 to adjust a transfer time of a first user input state, and a transfer interval is used to cyclically time transfer of subsequent user input state. Although three such cycles are shown in FIG. 5, it should be understood that this cycle of user input state transfer can continue during operation of host system 410 and game application 432. Periodic recurrences of the lag determination phase and the delivery adjustment phase can be performed to correct for drift of clocks and link timing among gaming controller 301 and game application 432.

Certain inventive aspects may be appreciated from the foregoing disclosure, of which the following are various examples.

Example 1

An apparatus, comprising one or more computer readable storage media, a processing system operatively coupled with the one or more computer readable storage media, and a user input interface comprising program instructions stored on the one or more computer readable storage media. Based on being read and executed by the processing system, the program instructions direct the processing system to at least identify a target pace for delivery of user input state to an application, determine, based at least on the target pace, one or more timing parameters for transfer of the user input state from a user input device, and indicate the one or more timing parameters to the user input device, where the user input device responsively transfers the user input state according to the one or more timing parameters.

Example 2

The user input interface of Example 1, where the one or more timing parameters comprise a transfer offset and a transfer interval for adjustment of transfer of successive user input state from the user input device, where the transfer offset is based at least in part on a lag between transmission of the user input state by the user input device and receipt of the user input state by the user input interface.

Example 3

The user input interface of Examples 1-2, comprising further program instructions, based on being executed by the processing system, direct the processing system to at least receive an indication of the target pace from the application, where the indication of the target pace comprises an indication of a recurrent event within a host system executing the application and a timing offset from the recurrent event.

Example 4

The user input interface of Examples 1-3, where the recurrent event comprises at least one of a display refresh indicator, a display vertical sync indicator, or a graphics frame rate timing characteristic of a graphics process of the host system.

Example 5

The user input interface of Examples 1-4, comprising further program instructions, based on being executed by the processing system, direct the processing system to at least receive a timing indicator transferred by the user input device that corresponds to a time when the user input device transmits the user input state.

Example 6

The user input interface of Examples 1-5, comprising further program instructions, based on being executed by the processing system, direct the processing system to at least determine a lag between transmission of the user input state by the user input device and receipt of the user input state by the user input interface, and determine, based on the target pace and the lag, the one or more timing parameters.

Example 7

The user input interface of Examples 1-6, where the timing indicator comprises a monotonically changing count generated by the user input device and included in communications comprising the user input state transferred by the user input device.

Example 8

The user input interface of Examples 1-7, comprising further program instructions, based on being executed by the processing system, direct the processing system to at least monitor timing associated with one or more requests from the application for user input state, and based at least on the timing associated with one or more requests, determine the target pace, where the target pace comprises at least a timing offset from a recurrent event within a host system executing the application.

Example 9

The user input interface of Examples 1-8, where the user input device comprises at least one of a gaming controller, keyboard, mouse, touchpad, adaptive controller, virtual reality controller, augmented reality controller, and touchscreen.

Example 10

A method of operating a user input interface on a host system, the method comprising identifying a target pace for delivery of user input state to an application, determining, based at least on the target pace, one or more timing parameters for transfer of the user input state from a user input device, and indicating the one or more timing parameters to the user input device, where the user input device responsively transfers the user input state according to the one or more timing parameters.

Example 11

The method of Example 10, where the one or more timing parameters comprise a transfer offset and a transfer interval for adjustment of transfer of successive user input state from the user input device, where the transfer offset is based at least in part on a lag between transmission of the user input state by the user input device and receipt of the user input state by the user input interface.

Example 12

The method of Examples 10-11, further comprising receiving an indication of the target pace from the application, where the indication of the target pace comprises an indication of a recurrent event within the host system executing the application and a timing offset from the recurrent event.

Example 13

The method of Examples 10-12, where the recurrent event comprises at least one of a display refresh indicator, a display vertical sync indicator, or a graphics frame rate timing characteristic of a graphics process of the host system.

Example 14

The method of Examples 10-13, further comprising receiving a timing indicator transferred by the user input device that corresponds to a time when the user input device transmits the user input state.

Example 15

The method of Examples 10-14, further comprising determining a lag between transmission of the user input state by the user input device and receipt of the user input state by the user input interface, and determining, based on the target pace and the lag, the one or more timing parameters.

Example 16

The method of Examples 10-15, where the timing indicator comprises a monotonically changing count generated by the user input device and included in communications comprising the user input state transferred by the user input device.

Example 17

The method of Examples 10-16, further comprising monitoring timing associated with one or more requests from the application for user input state, and based at least on the timing associated with one or more requests, determining the target pace, where the target pace corresponds to at least a recurrent event within the host system executing the application and a timing offset from the recurrent event.

Example 18

The method of Examples 10-17, where the user input device comprises at least one of a gaming controller, keyboard, mouse, touchpad, adaptive controller, virtual reality controller, augmented reality controller, and touchscreen.

Example 19

A user interface system, comprising an application interface configured to identify preferred delivery timing of user input state to an application, where the preferred delivery timing corresponds to at least a recurrent event within a host system executing the application and a timing offset from the recurrent event. The user interface system includes a timing adjustment system configured to determine, based at least on the preferred delivery timing, one or more timing parameters for transfer of the user input state from a user input device. The user interface system includes an input interface indicate the one or more timing parameters to the user input device, where the user input device responsively transfers the user input state according to the one or more timing parameters.

Example 20

The user interface system of Example 19, the timing adjustment system configured to determine a lag between transmission of the user input state by the user input device and receipt of the user input state by the user input system, and determine, based on the lag and the preferred delivery timing, the one or more timing parameters comprising a transfer offset and a transfer interval for adjustment of transfer of successive user input state from the user input device.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. An apparatus, comprising:
   one or more computer readable storage media;
   a processing system operatively coupled with the one or more computer readable storage media; and
   a user input interface comprising program instructions stored on the one or more computer readable storage media that, based on being read and executed by the processing system, direct the processing system to at least:
   identify a target pace for delivery of user input state to an application;
   determine, based at least on the target pace, one or more timing parameters for transfer of the user input state from a user input device; and
   indicate the one or more timing parameters to the user input device, wherein the user input device responsively transfers the user input state according to the one or more timing parameters.

2. The apparatus of claim 1, wherein the one or more timing parameters comprise a transfer offset and a transfer interval for adjustment of transfer of successive user input state from the user input device, wherein the transfer offset is based at least in part on a lag between transmission of the user input state by the user input device and receipt of the user input state by the user input interface.

3. The apparatus of claim 1, comprising further program instructions, based on being executed by the processing system, direct the processing system to at least:
   receive an indication of the target pace from the application;
   wherein the indication of the target pace comprises an indication of a recurrent event within a host system executing the application and a timing offset from the recurrent event.

4. The apparatus of claim 3, wherein the recurrent event comprises at least one of a display refresh indicator, a display vertical sync indicator, or a graphics frame rate timing characteristic of a graphics process of the host system.

5. The apparatus of claim 1, comprising further program instructions, based on being executed by the processing system, direct the processing system to at least:
   receive a timing indicator transferred by the user input device that corresponds to a time when the user input device transmits the user input state.

6. The apparatus of claim 5, comprising further program instructions, based on being executed by the processing system, direct the processing system to at least:
   determine a lag between transmission of the user input state by the user input device and receipt of the user input state by the user input interface; and
   determine, based on the target pace and the lag, the one or more timing parameters.

7. The apparatus of claim 5, wherein the timing indicator comprises a monotonically changing count generated by the user input device and included in communications comprising the user input state transferred by the user input device.

8. The apparatus of claim 1, comprising further program instructions, based on being executed by the processing system, direct the processing system to at least:
   monitor timing associated with one or more requests from the application for user input state; and
   based at least on the timing associated with one or more requests, determine the target pace, wherein the target pace comprises at least a timing offset from a recurrent event within a host system executing the application.

9. The apparatus of claim 1, wherein the user input device comprises at least one of a gaming controller, keyboard, mouse, touchpad, adaptive controller, virtual reality controller, augmented reality controller, and touchscreen.

10. A method of operating a user input interface on a host system, the method comprising:
   identifying a target pace for delivery of user input state to an application;
   determining, based at least on the target pace, one or more timing parameters for transfer of the user input state from a user input device; and
   indicating the one or more timing parameters to the user input device, wherein the user input device responsively transfers the user input state according to the one or more timing parameters.

11. The method of claim 10, wherein the one or more timing parameters comprise a transfer offset and a transfer interval for adjustment of transfer of successive user input state from the user input device, wherein the transfer offset is based at least in part on a lag between transmission of the user input state by the user input device and receipt of the user input state by the user input interface.

12. The method of claim 10, further comprising:
receiving an indication of the target pace from the application;
wherein the indication of the target pace comprises an indication of a recurrent event within the host system executing the application and a timing offset from the recurrent event.

13. The method of claim 12, wherein the recurrent event comprises at least one of a display refresh indicator, a display vertical sync indicator, or a graphics frame rate timing characteristic of a graphics process of the host system.

14. The method of claim 10, further comprising:
receiving a timing indicator transferred by the user input device that corresponds to a time when the user input device transmits the user input state.

15. The method of claim 14, further comprising:
determining a lag between transmission of the user input state by the user input device and receipt of the user input state by the user input interface; and
determining, based on the target pace and the lag, the one or more timing parameters.

16. The method of claim 14, wherein the timing indicator comprises a monotonically changing count generated by the user input device and included in communications comprising the user input state transferred by the user input device.

17. The method of claim 10, further comprising:
monitoring timing associated with one or more requests from the application for user input state; and
based at least on the timing associated with one or more requests, determining the target pace, wherein the target pace corresponds to at least a recurrent event within the host system executing the application and a timing offset from the recurrent event.

18. The method of claim 10, wherein the user input device comprises at least one of a gaming controller, keyboard, mouse, touchpad, adaptive controller, virtual reality controller, augmented reality controller, and touchscreen.

19. A user interface system, comprising:
an application interface configured to identify preferred delivery timing of user input state to an application, wherein the preferred delivery timing corresponds to at least a recurrent event within a host system executing the application and a timing offset from the recurrent event;
a timing adjustment system configured to determine, based at least on the preferred delivery timing, one or more timing parameters for transfer of the user input state from a user input device; and
an input interface indicate the one or more timing parameters to the user input device, wherein the user input device responsively transfers the user input state according to the one or more timing parameters.

20. The user interface system of claim 19, the timing adjustment system configured to:
determine a lag between transmission of the user input state by the user input device and receipt of the user input state by the user input system; and
determine, based on the lag and the preferred delivery timing, the one or more timing parameters comprising a transfer offset and a transfer interval for adjustment of transfer of successive user input state from the user input device.

* * * * *